(12) United States Patent
Hesse et al.

(10) Patent No.: US 6,251,995 B1
(45) Date of Patent: Jun. 26, 2001

(54) POLYOLEFIN SHEETS AND POLYOLEFIN COATINGS OF SUBSTRATES

(75) Inventors: Achim Hesse, Linz; Ulf Panzer, Perg; Christian Paulik, Linz; Anton Wolfsberger, Engerwitzdorf; Manfred Kirchberger, Prambachkirchen; Peter Niedersuess, Linz, all of (AT)

(73) Assignee: Borealis GmbH, Schwechat-Mannswoerth (AT)

( * ) Notice: Subject to any disclaimer, the term of this patent is extended or adjusted under 35 U.S.C. 154(b) by 0 days.

(21) Appl. No.: 09/275,686

(22) Filed: Mar. 24, 1999

(30) Foreign Application Priority Data

Apr. 3, 1998  (DE) .............................. 198 15 046

(51) Int. Cl.$^7$ .............................. C08F 8/00; C08L 23/00; C08L 23/04

(52) U.S. Cl. .............................. 525/191; 525/240

(58) Field of Search ...................... 525/191, 240

(56) References Cited

U.S. PATENT DOCUMENTS

| | | |
|---|---|---|
| 4,526,919 | 7/1985 | Edwards . |
| 4,714,716 | 12/1987 | Park . |
| 4,981,896 | * 1/1991 | Okada et al. . |
| 5,073,590 | * 12/1991 | Abe et al. .............................. 524/449 |
| 5,506,307 | 4/1996 | Memon . |

FOREIGN PATENT DOCUMENTS

| | | |
|---|---|---|
| 0177401 | 4/1986 | (EP) . |
| 0299486 | 1/1989 | (EP) . |
| 0400333 | 12/1990 | (EP) . |
| 0450342 | 10/1991 | (EP) . |
| 0472946 | 3/1992 | (EP) . |
| 0570221 | 11/1993 | (EP) . |
| 0574801 | 12/1993 | (EP) . |
| 0636863 | 2/1995 | (EP) . |
| 0640850 | 3/1995 | (EP) . |
| 0678527 | 10/1995 | (EP) . |
| 688817 | 12/1995 | (EP) . |
| 2001080 | 1/1979 | (GB) . |
| 53-128662 | 11/1978 | (JP) . |
| 59-49921 | 3/1984 | (JP) . |

OTHER PUBLICATIONS

J. Of Indust. Irradiation Tech., 1(3), 237–257 (1983): "Radiation Processed Polyolefin Polymer Blends" by Nancy M. Brooks.

"Silane–Crosslinked PE–LD for Low–Voltage Cable" by H. Vogt, Ludwigshafen, Kunststoffe 82 (1992)9, pp. 830–833.

American Chemical Society, Macromolecules 1989, 22, 3851–3858.: "Elastomeric Polypropylenes from Alumina–Supported Tetraalkyl Group IVB Catalysts. 1. Synthesis and Properties of High Molecular Weight Stereoblock Homopolymers" by John W. Collette et al.

Makromol. Chem. 189, 815–821 (1988): "Physical behaviour of stereoblock–isotactic polypropylene" by Francesco de Candia et al.

Thermoforming by James L. Throne, pp. 115–116, published in New York by Macmillan, 1986.

Kunststoffe 80 (1990) 7, pp. 830–837: "Peroxidische Initiatoren zum Herstellen und Modifizieren von Kunststoffen" by M. Dorn Hoellriegelskreuth.

Sheet Extrusion with Coextrusion, VDI–Verlag GmbH, Dusseldorf 1980 by Willi Predoehl.

G. Schenkel, Kunststoff–Extrudertechnik, Carl–Hanser–Verlag, Munich, 1963.

* cited by examiner

*Primary Examiner*—Nathan M. Nutter
(74) *Attorney, Agent, or Firm*—Jordan and Hamburg LLP

(57) ABSTRACT

Polyolefin sheets and/or polyolefin coatings of substrates, such as textile fabrics, plastic sheets, paper, cardboard and metal with a high dimensional accuracy and thermal shock stability, consisting of modified polypropylene polymers or mixtures of modified polypropylene polymers and unmodified propylene polymers, the polyolefin sheets and/or polyolefin coating being produced by conventional processing methods.

The polyolefin sheets and polyolefin coatings of substrates are suitable for use in the sectors of packaging, pharmacy, textile industry, vehicle equipment and machinery construction, electrical engineering, electronics, domestic appliances, medicine and the building industry.

14 Claims, No Drawings

POLYOLEFIN SHEETS AND POLYOLEFIN COATINGS OF SUBSTRATES

The invention relates to polyolefin sheets and/or polyolefin coatings of substrates, such as textile fabrics, plastic sheets, paper, cardboard and metal with a high dimensional accuracy and a thermal shock stability, which are suitable for use in the sectors of packaging, foods, pharmacy, textile and hygiene industry, in automobile construction, equipment construction and machine construction, electrical engineering, electronics, domestic appliances, medicine, the building industry, transport systems and transport packaging, as well as to a method for their production.

Polyolefin sheets and polyolefin coatings based on polyolefins such as polyethylene or polypropylene are known (G. Schenkel, Kunststoff-Extrudertechnik, Carl-Hanser-Verlag, Munich, 1963; W. PredHÏ, Folienextrusion mit Coextrusion (Sheet Extrusion with Coextrusion, VDI-Verlag, Dusseldorf 1980).

Polyethylene can be processed into sheets and coatings with good dimensional accuracy. However, the disadvantage of sheets and coatings, based on polyethylene, lies in the low thermal shock stability (Vicat B softening temperature of 78° C.), so that sheets and coatings cannot be used in fields, in which they are subjected to brief thermal stresses of more than 100° C., such as those caused by steam or by a thermal shock stress exerted on vehicle or equipment parts or by a short-circuit stress of electrical equipment or cables up to a power failure.

Known methods of increasing the thermal shock stability of polyethylene sheets and coatings are the cross linking by ionizing radiation (N. Brooks, J. of Indust. Irradiation Tech. 1 (3), 237–257), the graffing of silane compounds and the hydrolytic cross linking of grafted copolymers (H. Vogt, Kunststoffe 82, (1992) 9, 830–833), as well as the cross linking by peroxides (M. Dorn, Kunststoffe 90 (1990), 7, 830–837). A thermal shock stability of up to 100° C. is achieved for polyethylene by cross linking. The high expense of the additional processing steps and the inability to recycle the products are, however, disadvantages.

Sheets and coatings of polypropylene, with a Vicat B temperature of 86°–94° C., can be exposed briefly to a thermal shock stress of up to 140° C. The low dimensional accuracy is a disadvantage of sheets and coatings of polypropylene. During the production of sheets and coatings, "neck ins" transversely to the take-off direction occur already at medium take-off speeds and express themselves in a fluctuating width and thickness of the sheets and coatings.

For flat film extrusion, such as the chill roll extrusion, the extrusion coating and glazing roller methods, there are extreme flow irregularities, especially in the edge region, as the take-off speed or the output increases. These "draw variations" make it impossible to produce a sheet or a film coating with a uniform distribution of thicknesses and a constant sheet width. In many cases, this leads to plant stoppages because of tears, holes or to uncontrollable take-off or winding up or to an uneconomic production due to the low take-off speeds or the low output.

In the blown film process, there are instabilities in the blown film of conventional polypropylenes as the throughput or speed of the plant increases and this, in turn, leads to fluctuations in thickness and width. In many cases, the pumping of the blown film results in tears and, consequently, to a complete stoppage of the plant.

Known methods of improving the dimensional accuracy of sheets and coatings of polypropylene consist of using blends of polypropylene and 5 to 20% polyethylene (U.S. Pat. No. 4,526,919, Japanese patent 53 128 662, Japanese patent 59 049 921), blends of polypropylene, polystyrene and polybutadiene (German patent 2937528) or blends of polypropylene and poly(meth)acrylates (U.S. Pat. No. 5,506,307, European patent 570,221) for the production of sheets or coatings. However, it is a disadvantage of these additions that the thermal shock stability is decreased and the transparency of the sheets and coatings is decreased greatly.

It is an object of the present invention to develop sheets and coatings based on polypropylene, which have a high dimensional accuracy and thermal shock stability, as well as to develop a method for their production.

The inventive objective was accomplished by polyolefin sheets and/or polyolefin coatings of substrates, such as textile fabrics, plastic sheets, paper, cardboard and metal with a high dimensional accuracy and thermal shock stability, the polyolefin sheets and/or polyolefin coatings consisting of modified polypropylenes, which are present up to 100% by weight and preferably from 5 to 50% by weight in admixture with unmodified polypropylenes, and the unmodified polypropylenes consisting preferably of 95 to 50% by weight of 1) conventional polypropylene polymers, preferably propylene homopolymers and/or copolymers of propylene, ethylene and/or α-olefins, which were produced using Ziegler-Natta catalysts or metallocene catalysts and contain 4 to 18 carbon atoms and have a propylene content of 80.0 to 99.9% by weight, in the form of random copolymers, block copolymers and/or random block copolymers with melt indexes of 0.1 to 300 g/10 min at 230° C./2.16 kg and preferably 1 to 100 g/10 min at 230° C./2.16 kg, and/or 2) a polyolefin mixture with an Mw/Mn ratio of 2 to 6 and a melt index of 1 to 40 g/10 min at 230° C./2.16 kg, which consists of 2.1) 60 to 98% by weight of a crystalline copolymer of 85 to 99.5% by weight of propylene and 15 to 0.5% by weight of ethylene and/or an α-olefin of the general formula $CH_2=CHR$, in which R is a linear or branched alkyl group with 2 to 8 carbon atoms, 2.2) 2 to 40% by weight of an elastic copolymer of 20 to 70% by weight of ethylene and 80 to 30% by weight of propylene and/or an α-olefin of the general formula $CH_2=CHR$, in which R is a linear or branched alkyl group with 2 to 8 carbon atoms, and/or 3) largely amorphous polypropylenes or propylene copolymers with a crystalline polypropylene or crystalline propylene copolymer content of less than 10% by weight, an enthalpy of melting of less than 40 J/g and a melt index of 0.1 to 100 g/10 min at 230° C./2.16 kg, the largely amorphous polypropylene being a homopolymer of propylene and/or a copolymer of propylene of at least 80 mole percent of propylene and not more than 20 mole percent of one or more α-olefins of the general formula $CH_2=CHR$, in which R is a linear or branched alkyl group with 2 to 8 carbon atoms, and/or 4) non-isotactic propylene homopolymers with a melting point of 145° to 165° C. and a melt viscosity of 200,000 cps at 190° C., a heat of crystallization of 4 to 10 cal/g and a 35% by weight to 55% by weight solubility in diethyl ether, the polypropylenes containing 0.01 to 2.5% by weight of stabilizers, 0.01 to 1% by weight of processing aids and, optionally, 0.1 to 1% by weight of antistats, 0.2 to 3% by weight of pigments, 0.05 to 1% by weight of nucleating agents, 2 to 20% by weight of flame retardants, in each case based on the sum of the polypropylenes, as auxiliary materials and/or optionally 10 to 70% by weight and preferably 20 to 50% by weight, based on the sum of the polypropylenes, of inorganic and/or organic fillers and/or reinforcing materials, the modified polypropylenes, pursuant to the invention, being modified propylene polymers with melt indexes of 0.1 to 50 g/10 min at 230° C./2.16 kg and preferably of 1 to 40 g/10 min at 230° C./2.16 kg, and a ratio of the intrinsic viscosity of the modified polypropylene to the intrinsic viscosity of the unmodified polypropylene of largely the same weight average molecular weight being 0.20 to 0.95, and being produced a) by the treatment of propylene homopolymers and/or copolymers of propylene and ethylene or α-olefins with 4 to 18 carbon atoms as well as of mixtures of said polypropylenes with multi-functional ethylenically unsaturated monomers in the presence of ionizing radiation or of thermally decomposing free radical-forming agents or b) by the reaction of finctionalized polypropylenes, preferably of polypropylenes containing acid and/or acid anhydride groups, with multi-functional compounds of opposite reactivity, preferably with $C_2$ to $C_{16}$ diamines and/or $C_2$ to $C_{16}$ diols, or c) by the hydrolytic condensation of polypropylenes, which contain hydrolyzable silane groups.

Examples of these modified polypropylenes, prepared by the treatment of polypropylenes with multi-functional, ethylenically unsaturated monomers in the presence of ionizing radiation or thermally decomposing free radical-forming agents are, in particular:

polypropylenes modified by the reaction of polypropylenes with bismaleimido compounds in the melt (European patents 574 801 and 574 804), polypropylenes modified by the treatment of polypropylenes with multi-functional, ethylenically unsaturated monomers under the action of ionizing radiation (European patent 678527), polypropylenes modified by the treatment of polypropylenes with multi-fnctional, ethylenically unsaturated monomers in the presence of peroxides in the melt (European patents 688817 and 450342).

A preferred variation of th e modified polypropylenes, produced by the treatment of propylene homopolymers and/or copolymers of propylene and ethylene or α-olefins with 4 to 18 carbon atoms as well as of mixtures of said polypropylenes with multi-functional ethylenically unsaturated monomers in the presence of thermally decomposing free radical-forming agents are modified polypropylene polymers, which are produced by a continuous method, in which 1) polypropylene particles, in the form of powders, granulates or grit with a preferred particle size ranging from 0.001 to 7 mm, which consist of 1.1) propylene homopolymers, especially of propylene homopolymers with a bimodal molecular weight distribution, a weight average molecular weight $M_w$ of 500,000 to 1,500,000 g/mole, a number average molecular weight $M_n$ of 25,000 to 100,000 and $M_w/M_n$ values of 5 to 60, which were synthesized in a reactor cascade using Ziegler-Natta catalysts or metallocene catalysts and/or of 1.2) copolymers of propylene and ethylene or α-olefins with 4 to 18 carbon atoms, preferably of random propylene copolymers, propylene block copolymers, random propylene block copolymers and/or elastomeric polypropylenes, or of mixtures of said modified polypropylenes, are mixed in a continuous mixer with 0.05 to 3% by weight, based on the polypropylenes used, of acyl peroxides, alkyl peroxides, hydroperoxides, peroxycarbonates and/or peresters as thermally decomposing free radical-fomring agents, the thermal decomposition of which preferably is concluded at a temperature below 210° C. and which optionally are diluted with an inert solvent, and heated to 30° to 100° C. and preferably to 70° to 90° C., 2) readily volatile bifunctional monomers, especially $C_4$ to $C_{10}$ dienes and/or $C_7$ to $C_{10}$ divinyl compounds, are absorbed by the polypropylene particles from the gas phase, preferably in continuous flow mixers as continuous gas-solid absorbers, at a temperature T of 20° C. to 120° C. to and preferably of 60° to 100° C. and at an average absorption time $\tau_s$ of 10 seconds to 1,000 seconds and preferably of 60 seconds to 600 seconds, the proportion of bifunctional, unsaturated monomers in the polypropylene particles being 0.01 to 10% by weight and preferably 0.05 to 2% by weight, based on the polypropylenes used, subsequently 3) the polypropylene particles, in which the acyl peroxides, alkyl peroxides, hydroperoxides, peroxycarbonates and/or peresters are absorbed as thermally decomposing free radical-forming agents and the bifunctional, unsaturated monomers are absorbed, are melted under an atmosphere of an inert gas and these readily volatile bifunctional monomers at 110° to 210° C. in continuously operating kneaders or extruders, preferably in twin-screw extruders and, at the same time, the thermally decomposing free radical-forming agents are decomposed, 4) the melt is then heated to 220° to 300° C., unreacted monomers and decomposition products being removed and 5) the melt is granulated in a known manner, and for which, before step 1) and/or 5) of the method and/or before or during step 3) and/or 4) of the method, 0.01 to 2.5% by weight of stabilizers, 0.1 to 1% by weight of antistats, 0.2 to 3% by weight of pigments, 0.05 to 1% by weight of nucleating agents and/or 0.01 to 5% by weight of processing aids, based on the polypropylenes used, are added.

Furthermore, as modified propylene polymers, which are contained in the inventive polyolefin sheets and/or polyolefin coatings, modified propylene polymers are suitable, which are produced by the polymer-like reaction of functionalized polypropylenes, preferably of polypropylenes containing acid and/or acid anhydride groups, with multi-functional compounds of opposite reactivity, preferably with $C_2$ to $C_{16}$ diamines and/or $C_2$ to $C_{18}$ diols.

Examples of modified propylene polymers, produced by polymer-like reactions, are in particular:

polypropylenes modified by the reaction of polypropylenes, grafted with maleic anhydride, with diamines or polyglycols (European patent 177401, Japanese patent 08 176 365), polypropylenes modified by the reaction of propylenes, containing acid or acid anhydride groups with polymers containing epoxy, hydroxy or amino groups (European patents 307684 and 299486).

A further variation of the modified propylene polymers, contained in the polyolefin sheets and/or polyolefin coatings, are modified propylene polymers, which are produced by the hydrolytic condensation of polypropylenes, which contain hydrolyzable silane groups. The products, described in the German patent 4107635 or the U.S. Pat. No. 4,714,716 are examples.

The unmodified propylene polymers 1), which are optionally contained in the inventive polyolefin sheets and/or polyolefin coatings, preferably are propylene homopolymers and/or copolymers of propylene and ethylene or α-olefins with 4 to 18 carbon atoms as well as mixtures of said polypropylenes with melt indexes of 0.1 to 300 g/10 min at 230° C./2.16 kg and preferably of 1 to 100 g/10 min at 230° C./2.16 kg. In this connection, especially suitable are propylene homopolymers with a bimodal molecular weight distribution, weight average molecular weights $M_w$ of 50,000 to 1,500,000 g/mole, number average molecular weights Mn of 25,000 to 100,000 g/mole and $M_w/M_n$ values of 2 to 60, which were produced in a reactor cascade. The copolymers of propylene and ethylene or α-olefins can be present in the form of random propylene copolymers, propylene block copolymers and/or random propylene block copolymers.

The polyolefin mixtures of crystalline copolymers and elastic copolymers, optionally contained as unmodified polypropylene component 2) in the inventive polyolefin films and/or polyolefin cuttings, are polymer mixtures described, for example, in the European patents 400 333 or 472 946.

The largely amorphous polypropylenes or propylene copolymers, optionally contained in the inventive polyolefin sheets and/or polyolefin coatings as unmodified polypropylene components 3) are, in particular, stereo block polypropylenes, which are prepared, for example, by using highly active Ziegler-Natta catalysts fixed on a metal oxide (Collette, J., Macromolecules 22 (1989), 3851–3858; German patent 2830160) or soluble Ziegler-Natta catalysts (de Candia, F., Makromol. Chem. 189 (1988), 815–821), optionally with subsequent reactive modification (European patent 636863) and/or degradation (European patent 640 850).

Examples of the non-isotactic propylene homopolymers, optionally contained in the inventive polyolefin sheets and/or polyolefin coatings as unmodified polypropylene components 4), are the products described in the European patent 475 307 or in the European patent 475 308.

Especially preferred are polyolefin sheets and/or polyolefin coatings, which contain, aside from the modified polypropylenes, several of the unmodified polypropylenes 1) to 4).

The stabilizers, contained in the inventive polyolefin sheets and/or polyolefin coatings, preferably are mixtures of 0.01% to 0.6% by weight of phenolic antioxidants, 0.01% to 0.6% by weight of 3-arylbenzofuranones, 0.01% to 0.6% by weight of processing stabilizers based on phosphites, 0.01% to 0.6% by weight of high temperature stabilizers based on disulfides and thioethers and/or 0.01% to 0.8% by weight of sterically hindered amines (HALS).

Suitable phenolic antioxidants are 2-t-butyl-4,6-dimethylphenol, 2,6-di-t-butyl-4-methylphenol, 2,6-di-t-butyl-4-isoamylphenol, 2,6-di-t-butyl-4-ethylphenol, 2-t-butyl-4,6-diisopropylphenol, 2,6-dicyclopentyl-4-methylphenol, 2,6-di-t-butyl-4-methoxymethylphenol, 2-t-butyl-4,6-dioctadecylphenol, 2,5-di-t-butylhydroquinone, 2,6-di-t-butyl-4,4-hexadecyloxyphenol, 2,2'-methylene-bis (6-t-butyl-4-methylphenol), 4,4'-thio-bis-(6-t-butyl-2-methylphenol), octadecyl 3(3,5-di-t-butyl-4-hydroxyphenyl) propionate, 1,3,5-trimethyl-2,4,6-tris(3',5'-di-t-butyl-4-hydroxybenzyl)benzene and/or pentaerythritol-tetrakis(3-(3,5-di-t-butyl-4-hydroxyphenyl)) propionate.

As benzofuranone derivative, 5,7-di-t-butyl-3-(3,4-dimethylphenyl)-3H-benzofuran-2-one, in particular, is suitable.

As HALS compounds, bis-2,2,6,6-tetramethyl-4-piperidyl sebacate and/or poly-((1,1,3,3-tetramethylbutyl)-imino)-1,3,5-triazine-2,4-diyl)(2,2,6,6-tetramethylpiperidyl)-amino)-hexamethylene-4-(2,2,6,6-tetramethyl)piperidyl)-imino) are particularly suitable.

The nucleating agents, optionally contained in the inventive polyolefin sheets and/or polyolefin coatings, preferably are a-nucleating agents, such as talcum, sorbitol and sorbitol derivatives, sodium benzoate or the sodium salt of methylene-bis(2,4-di-t-butylphenol) phosphoric acid or β-nucleating agents, such as adipic acid, the dianilide of adipic acid, salts of dicarboxylic acids, such as calcium pimelate, quinacridinonequinone and/or N,N'-dicyclododecyl-4,4-biphenyldicarboxamide.

As processing aids, the inventive polyolefin sheets and/or polyolefin coatings may contain calcium stearate, magnesium stearate and/or waxes.

Examples of inorganic fillers and/or reinforcing materials, optionally contained in the inventive polyolefin sheets and/or polyolefin coatings, are silica, particularly in the form of glass or quartz; silicates, particularly talcun; titanates, titanium dioxide, aluminum oxide, kaolin, magnesium oxide, magnesite, iron oxides, silicon carbide, silicon nitride, barium sulfate and/or calcium carbonates.

Examples of organic fillers and/or reinforcing materials, contained in the inventive polyolefin sheets and/or polyolefin coatings, are mechanical wood pulp, fibers or particles of cellulose, starch, poly(methyl methacrylate), polyvinyl alcohol, polytetrafluoroethylene, polyamide, polyethylene terephthalate or duroplastic synthetic materials.

The inventive polyolefin sheets preferably are sheets, which were produced according to the blow molding method, the chill roll extrusion method, the extrusion coating or glazing roller method, or sheets, which are foamed with chemical or physical blowing agents. They can be produced as single sheets or as coextruded sheets.

The inventive polyolefin coatings are coatings, which have been produced by the calendering process, the chill roll extrusion process, the glazing roller process, the extrusion coating process, the pipe coating process or the cable coating process. The coatings of substrates result in two-dimensional multi-component composites, which are built up from one or more layers of the polypropylene mixtures and metal foil, plastic sheets, paper sheets and/or textile sheets, or radial coatings in the form of pipe coatings, cable insulations or cable sheaths.

Intermediate layers of adhesion promoters, 0.5 to 20 µm thick, consisting of polar olefin copolymers and/or grafted olefin copolymers, can be interposed between the substrate layer and the inventive polyolefin coating.

Preferably, the polypropylene components in the polyolefin sheets or coatings, produced by the film blowing or calendering method, consist of 5 to 50% by weight of modified polypropylenes with melt indexes of 0.25 to 8 g/10 min at 230° C./2.16 kg and 95 to 50% by weight of unmodified polypropylenes with melt indexes of to 0.25 to 20 g/10 min at 230° C./2.16 kg. The unmodified polypropylenes consist, in particular, of copolymers of propylene, ethylene and/or α-olefins with 4 to 18 carbon atoms with a propylene content of 80.0 to 99.9% by weight in the form of random copolymers, block copolymers and/or random block copolymers and/or the propylene components 2), 3) and/or 4).

The polypropylene components of sheets or coatings, which were produced by the chill roll extrusion method, preferably consist of 5 to 30% by weight of modified polypropylenes with melt indexes of 1 to 30 g/10 min at 230° C./2.16 kg and 95 to 70% by weight of unmodified polypropylenes with melt indexes of 1 to 40 g/10 min at 230° C./2.16 kg.

The polypropylene components of sheets or coatings, which were produced according to the glazing roller method, preferably consist of 5 to 30% by weight of modified polypropylenes with melt indexes of 0.25 to 15 g/10 min at 230° C./2.16 kg and 95 to 70% by weight of unmodified polypropylenes with melt indexes of 0.25 to 20 g/10 min at 230° C./2.16 kg.

Polyolefin sheets, foamed with physical and/or chemical blowing agents, preferably contain, as polypropylene component, mixtures of 5 to 100% by weight of modified polypropylenes with melt indexes of 0.25 to 12 g/10 min at 230° C./2.16 kg and 0 to 95% by weight of unmodified polypropylenes with melt indexes of 0.25 to 12 g/10 min at 230° C./2.16 kg.

The polypropylene components of polyolefin coatings, which were produced by the extrusion coating process, preferably consist of 5 to 30% by weight of modified polypropylenes with melt indexes of 1 to 50 g/10 min at 230° C./2.16 kg and 95 to 70% by weight of unmodified polypropylenes with melt indexes of 2 to 100 g/10 min at 230° C./2.16 kg. The unmodified polypropylenes, in particular, are copolymers of propylene, ethylene and/or α-olefins with 4 to 18 carbon atoms with a propylene content of 80.0 to 99.9% by weight in the form of random copolymers, block copolymers and/or random block copolymers and/or the polypropylene components 2), 3) and/or 4).

The polyolefin sheets and/or polyolefin coatings of substrates, such as textile fabrics, plastic sheets, paper, cardboard and metal with a high dimensional accuracy and thermal shock stability are produced according to a method by melting the polyolefins in continuous kneaders, preferably extruders with an L/D of 20 to 33 at temperatures of 160° to 320° C., homogenizing and a) discharging over a ring-shaped die, taking off as a blown film as air is being forced in or, with interposing of further melt layers, as a co-extruded blown film, pinching off, optionally trimming and winding up, or b) charging as a melt onto mixing rolls and/or onto a calender, cooling, trimming and winding up the sheet, or laminating it on two-dimensional sheets of metal foil, plastic sheets, paper sheets or textile sheets, optionally with interposing a layer of adhesion promoter, and winding up the multi-component composites, or c) discharging over a flat film die, depositing on chill roll extrusion equipment and taking off as a sheet, trimming and winding up or, in the case of chill roll extrusion equipment with several extruders, taking off as a co-extruded sheet, trimming and winding up, or laminating or coating directly on two-dimensional sheets of metal foil, plastic sheets, paper sheets or textile sheets, optionally with a interposing a layer of adhesion promoter, and winding up the multi-component composite, or d) charging as a melt on a glazing roller, cooling, taking off, trimming and winding up as a thermoformed sheet or "in-line" thermoforming of articles or laminating on flat sheets of metal foil, plastic sheets, paper sheets or textile sheets, optionally with interposing a layer of adhesion promoter, and winding up the multi-component composites, or e) after adding measured amounts of blowing agents, discharging over a flat film die onto a glazing roller or chill roll extrusion equipment, taking off as a foamed sheet, trimming and winding up, or discharging over a ring-shaped die, optionally cooling while forcing in air and taking off over a calibrating mandrel, optionally with internal air cooling, as a foamed blown film, cutting open, collapsing and winding up, or f) discharging the melt film according to the extrusion coating method directly onto the two-dimensional sheets of metal foil, plastic sheets, paper sheets or textile sheets, optionally with interposing a layer of adhesion promoter, and winding up the multicomponent composite, or g) discharging over a flat film die of pipe-coating equipment and sealing the molten material onto the rotating pipe, optionally with interposing a layer of adhesion promoter, or h) discharging over a ring die after previously introducing the wire cores or the cabled single conductors and taking off as a single conductor or as a cabled single conductor, which is provided with a cable sheath, and winding up, the polyolefins comprising modified polypropylenes, which are present up to 100% by weight and preferably from 5 to 50% by weight in admixture with unmodified polypropylenes, and the unmodified polypropylenes, preferably 95 to 50% by weight, consisting of 1) conventional propylene polymers, preferably propylene homopolymers and/or of copolymers of propylene, ethylene and/or α-olefins with 4 to 18 carbon atoms, produced preferably using Ziegler-Natta catalysts or metallocene catalysts, with a propylene content of 80.0 to 99.9% by weight in the form of random copolymers, block copolymers and/or random block copolymers, with melt indexes of 0.1 to 300 g/10 min at 230° C./2.16 kg and preferably of 1 to 100 g/10 min at 230° C./2.16 kg, and/or 2) a polyolefin mixture with an $M_w/M_n$ ratio of 2 to 6 and a melt index of 1 to 40 g/10 min at 230° C./2.16 kg, which consists of 2.1) 60 to 98% by weight of a crystalline copolymer of 85 to 99.5% by weight of propylene and 15 to 0.5% by weight of ethylene and/or an α-olefin of the general formula $CH_2$=CHR, in which R is a linear or branched alkyl group with 2 to 8 carbon atoms, 2.2) 2 to 40% by weight of an elastic copolymer of 20 to 70% by weight of ethylene and 80 to 30% by weight of propylene and/or an α-olefin of the general formula $CH_2$=CHR, in which R is a linear or branched alkyl group with 2 to 8 carbon atoms, and/or 3) substantially amorphous polypropylenes or propylene copolymers containing less than 10% by weight of crystalline polypropylene or crystalline propylene copolymer, having an enthalpy of melting of less than 40 J/g and a melt index of 0.1 to 100 g/10 min at 230° C./2.16 kg, the substantially amorphous polypropylene being a homopolymer of propylene and/or a copolymer of propylene of at least 80 mole percent of propylene and not more than 20 mole percent of one or more α-olefins of the general formula $CH_2$=CHR, in which R is a linear or branched alkyl group with 2 to 8 carbon atoms, and/or 4) non-isotactic propylene homopolymers with a melt point of 145° to 165° C., a melt viscosity of 200,000 cps at 190° C., a heat of crystallization of 4 to 10 cal/g and a solubility in diethylether of 35 to 55% by weight, 0.01 to 2.5% by weight of stabilizers, 0.01 to 1% by weight of processing aids and, optionally, 0.1 to 1% by weight of antistats, 0.2 to 3% by weight of pigments, 0.05 to 1% by weight of nucleating agents, 2 to 20% by weight of flame retardants, in each case based on the sum of the polyolefins, being added to the polyolefins as processing aids and/or optionally 10 to 70% by weight and preferably 20 to 50% by weight, based on the sum of the polyolefins, of inorganic and/or organic fillers and/or reinforcing materials being added to the polyolefins, pursuant to the invention, the modified polypropylenes being modified propylene polymers with melt indexes of 0.1 to 50 g/10 min at 230° C./2.16 kg and preferably of 1 to 40 g/10 min at 230° C./2.16 kg and a ratio of the intrinsic viscosity of the modified polypropylene to the intrinsic viscosity of the unmodified polypropylene with substantially the same weight average molecular weight being 0.20 to 0.95 and are prepared a) by treating propylene homopolymers and/or copolymers of propylene and ethylene or α-olefins with 4 to 18 carbon atoms as well as of mixtures of said polypropylenes with multifunctional, ethylenically unsaturated monomers in the presence of ionizing radiation or thermally decomposing free radical-forming agents, or b) by reacting finctionalized polypropylenes, preferably polypropylenes containing acid and/or acid anhydride groups, with multifunctional compounds of opposite reactivity, preferably with $C_2$ to $C_{16}$ diamines and/or $C_2$ to $C_{16}$ diols, or c) by the hydrolytic condensation of polypropylenes, which contain hydrolyzable silane groups.

Extruders with short compression screws or 3-zone screws with L/D=20 to 40 are suitable for melting the modified polypropylenes or polypropylene mixtures pursuant to the inventive method. Preferably, 5-zone screws with a feed zone, compression zone, shear zone, decompression zone and homogenizing zone are preferred. Screws with cutting depths of 1:2.5 to 1:3.5 are particularly suitable. It is particularly advantageous to interpose static mixers or melt pumps between the cylinder and the nozzle.

For the production of blown film pursuant to the inventive method, film blowing equipment with ring-shaped dies with diameters ranging from 50 to 600 mm are preferred. Advantageous melting temperatures fall with the range of 190° to 280° C. The usual thicknesses for blown films of the polyolefin mixtures are 6 to 300 µm.

Sheets and coating of modified polypropylenes or polypropylene mixtures, with thicknesses of 60 to 1,200 µm and especially of 200 to 600 µm, are preferably produced on calendering equipment comprising a plasticizing extruder or a plasticizing kneader, mixing rolls, 4-roller F calender with cooling rollers and tempering rollers and a take-off unit, particularly under the following operating conditions:

cylinder temperatures of the plasticizing extruder ranging from 190° to 240° C., mass temperature of the melt at the outlet gap of 180° to 230° C., calender roll temperature increasing from 185° to 215° C., friction of 1:1.5 to 1:2.5, shock-like cooling of the sheet upon leaving the calender, to 5° to 35° C.

subsequent tempering of the sheet at 70° to 145° C.

Preferably, sheets and coatings are produced from the modified polypropylenes or polypropylene mixtures with thicknesses of 20 to 200 µm according to the chill roll extrusion method. When the sheet thicknesses are greater than 200 µm, one-sided cooling for this method can result in a tendency to roll up and/or to have different properties. The sheet is manufactured on conventional chill roll extrusion equipment comprising a flat film die, a suction knife, an air knife, a cooling roller I, a stripping roller, a cooling roller II and a take-off unit. The preferred temperatures of the melt of the polyolefin mixture leaving the flat film die ranges from 200° to 260° C. Higher melt temperatures are advantageous for sheets with a high gloss and a high transparency. Both cooling rollers should be adjusted to 10° to 80° C. and preferably from 15° to 40° C. Equipment with an adapter or with nozzled coextrusion is used for the production of coextrusion sheets 20 to 200 µm thick; the temperatures of the cooling rollers for this. setup usually range from 15° to 70° C.

Sheets and coatings of the modified polypropylenes or polypropylene mixtures, with thicknesses of 0.20 to 10 mm, are preferably manufactured according to the glazing roller technology. Sheets produced by this technology with thicknesses less than 0.20 mm thick have an unfavorable thickness distribution. Advantageous mass temperatures of the melt of modified polypropylenes or polypropylene mixtures are of the order of 190°to 250° C.

The continuous kneaders for the inventive production of foam sheets from the modified polypropylenes or polypropylene mixtures can be single screw extruders with an L/D of 20 to 40 or synchronous twin screw extruders or extruder cascades of homogenizing extruders (single screw or twin screw) and foaming extruders. Optionally, a melt pump and/or a static mixer can be used additionally between the extruder and the die head. The blowing agents, added to the granulate or the polymer melt, preferably are:

blowing agents, which split off a gas, such as sodium hydrogen carbonate, azodicarbonamide, citric acid/bicarbonate blowing systems and/or cyanuric acid trihydrazide, readily volatile hydrocarbons, such as pentane, isopentane, propane and/or isobutane, halogenated hydrocarbons, such as monofluorotrichloromethane and/or difluoromono-chloromethane, gases, such as nitrogen, argon and/or carbon dioxide.

Advantageous nozzle temperatures for discharging the melt, which contains the blowing agent, are 150° to 200° C. Preferable foam densities of the foam sheets of the modified polypropylenes or polypropylene mixtures range from 10 to 700 kg/m$^3$ and especially from 10 to 500 kg/m$^3$.

The extrusion coating or coextrusion coating of metal foil, plastic sheets, paper sheets or textile sheets with melts of the polyolefin mixtures, on the other hand, requires mass temperatures ranging from 190° to 320° C. Usual coating thicknesses are between 5 and 70 µm.

For the extrusion coating of metal pipes, mass temperatures for the melts of modified polypropylenes or polypropylene mixtures of 240° to 320° C. and a pre-heating heating of the pipe material to 115° to 160° C. are required.

The inventive production of single cables with cable insulation of the modified polypropylenes or polypropylene mixtures requires preheating of the conductor core material to 115°to 150° C. The conductor material is coated by extrusion with the modified polypropylenes or polypropylene mixtures at melt temperatures of 190°to 285° C. Foamed conductor insulations are produced by modified polypropylenes or polypropylene mixtures containing blowing agents. Cable sheaths are produced with sheathing layers of the modified polypropylenes or polypropylene mixtures by extrusion coating the individual cables or the cabled individual cables at melt temperatures of 200°to 275° C.

For the inventive method of producing polyolefin coatings, the substrates may optionally be pretreated by known methods, such as the application of corona discharges or by ozone, in order to achieve improved adhesion.

On the other hand, a layer, 0.5 to 20 µm thick, of adhesion promoter of polar olefin copolymers and/or grafted olefin copolymers, such as EVA copolymers, copolymers of ethylene and acrylic acid or of ethylene and methacrylate, or polyethylene or polypropylene, grafted with unsaturated carboxylic acids or carboxylic acid anhydrides, may be interposed between the substrate and the polyolefin coating.

The special advantage of the inventive polyolefin sheets and/or polyolefin coatings consists therein, on the basis of the inventive polypropylene formulations, polyolefin sheets and/or polyolefin coatings can be produced which, compared to sheets and coatings based on polyethylene, have the advantage of a higher thermal shock stability and, compared to sheets and coatings based on conventional propylene polymers, have the advantage of a higher dimensional accuracy and an improved thermal shock stability and can be produced more readily due to higher production speeds and fewer plant stoppages.

Areas of use for the inventive polyolefin sheets and polyolefin coatings preferably are the packaging sectors, especially for packaging foods, detergents and drugs, the textile and clothing industry, especially for industrial protective clothing, sports and military clothing, interlining material and decorative and covering nonwovens, of the hygiene industry, especially for baby diapers, incontinence products, panty inserts and sanitary napkins, in the medical sector, particularly for operating room clothing, clothing to protect against infection, table and bed covers, in construction, especially for geotextile sheets, thermal and sound insulation, drainage and dividing nonwovens and roof linings. in vehicle, equipment and machinery construction, electrical engineering, electronics, transport systems and transport packaging, domestic appliances and office and organization requirements.

The invention is explained by the following examples.

EXAMPLE 1

Preparation of the Modified Propylene Polymers

A powdery polypropylene homopolymer, with a melt index of 0.25 g/10 at 230° C./2.16 kg and an average particle diameter of 0.37 mm, is added continuously in measured amounts to a continuous, heatable mixer. Furthermore, 0.35% by weight of divinylbenzene and 0.06% by weight of 2,5-bis(t-butylperoxy)-2,5-dimethylhexane, in each case based on the polypropylene homopolymer, are added continuously, in metered amounts to the continuous, heatable mixer. The polypropylene homopolymer, charged with the reaction materials, is mixed homogeneously at 45° C. and, after an average residence time of 13 minutes, melted at a temperature of 235° C. After a degassing step, 0.1% by weight of tetrakis(methylene(3,5-di-t-butylhydroxycinnamate))methane and 0.1% by weight of tris(2,4-di-t-butylphenylphosphite) are added to the extruder. The melt is discharged and granulated.

The resulting modified polypropylene contains 0.31% by weight of bound divinylbenzene, as determined by IR spectroscopy, and has a melt index of 2.0 g/10 at 230° C./2.16 kg and a crystallization point (DSC) of 128.5° C.

Preparation of the Polypropylene Mixture

A mixture of
15% by weight of a modified polypropylene, containing 0.31% by weight of divinylbenzene and having a melt index of 2.0 g/10 at 230° C./2.16 kg and a crystallization point (DSC) of 128.5° C. and 85% by weight of a polypropylene homopolymer, having the type name of Daplen D 2 XMOD, a melt index of 2.1 g/10 at 230° C./2.16 kg and a density of 0.905 g/cc at 23° C., is supplied by means of a metering system as a "dry blend" to the feeding funnel of a Kiefel-70 blown film extruder, with a diameter of 70 mm, 25 D and a temperature profile of 180°/210°/220°/240°/250° C., melted and extruded at 240° C. through a ring-shaped die having a diameter of 150 mm and a gap width of 1.2 mm. After leaving the ring-shaped die, the melt is inflated with an inflation ratio of 1:3, cooled by means of air, fixed by a calibrating basket and an iris diaphragm and taken off by means of nip rolls. Subsequently, the sheet is wound up on a combined contact/central winder.

Up to the maximum output of the equipment of 150 kg/h, the sheet can be produced at take-off speeds up to 50 m/min, a stable blown film being produced. At 3,000 running meters wind-up length, the reeled film has a true edge and is completely flat. The distribution of the thicknesses of the sheet is 40±0.5 µm. The sheet has a tensile strength of 43 MPa, an elongation at break of 350% and a tensile modulus of elasticity of 1,950 MPa.

The sheet can be produced without difficulties on an automatic bag-making machine. Exposure of the bag for 30 minutes to steam at 142° C. for medical applications does not lead to any tearing of the bag and the sheet does not become cloudy.

The manufacture of sheets from 100% of the polypropylene homopolymer, having the type name of Daplen D 2 XMOD, a melt index of 2.6 g/10 at 230° C./2.16 kg and a density of 0.905 g/cc at 23° C. on the same blown film equipment is possible only up to an output of 105 kg/h and up to take-off speeds not exceeding 35 m/min. Moreover, there are blowing instabilities and pumping of the blown film tube. The distribution of thicknesses of the sheet is 40±1.9 µm at 35 m/min. At 3,000 running meters, the reeled film has folds and a washboard pattern and the edges are untrue. The sheet can therefore not be used for further processing on the bag-manufacturing equipment. The sheet has a longitudinal tensile strength of 36 MPa, an elongation of 560% and a modulus of elasticity of 1450 MPa.

A 40 µm thick sheet, produced for comparison from LDPE, having the type name of Daplen 2140 F, a melt index of 0.75 g/10 at 190° C./2.16 kg and a density of 0.923 g/cc at 23° C. under similar processing conditions can also be processed at the plant maximum of 150 kg/h and 50 m/min. When the sheet is acted upon with hot steam, the sheet material melts immediately.

EXAMPLE 2

Synthesis of the Modified Propylene Polymers

In the internal mixer, 0.15% by weight of 2,6-dicyclopentyl-4-methylphenol and 0.15% by weight of bis-2,2,6,6-tetramethyl-4-piperidyl sebacate are reeled onto a powdery polypropylene homopolymer with a melt index of 8.0 g/10 at 230° C./2.16 kg and an average particle diameter of 0.28 mm, and the mixture is conveyed pneumatically by a 1:12 mixture of butadiene and nitrogen into a 0.20×3.50 m cassette reactor with 4 integrated cathodes of a low energy accelerator of the band beam type (energy of 250 keV and a radiation output of 4×10 KW) and integrated vibration equipment. The throughput at a radiation temperature of 85° C. is 4.6 kg/minute.

The resulting modified polypropylene mixture has a melt index of 4.8 g/10 at 230° C./2.16 kg.

Preparation of a Chill Roll Extruded Sheet

In a tumbling mixer
20% by weight of a powdery, modified polypropylene mixture, with a melt index of 4.8 g/10 at 230° C./2.16 kg
60% by weight of a polypropylene copolymer, having the type name of Daplen KFC 2004, a melt index of 8.5 g/10 at 230° C./2.16 kg, a density of 0.905 g/cc at 23° C. and an ethylene content of 4 mole percent,
20% by weight of a reactor blend, having a type name of Daplen Raheco K 2033, an ethylene content of 33 mole percent a melt index of 7.5 g/10 at 230° C./2.16 kg and consisting of a crystalline propylene-ethylene copolymer and of an elastic ethylene-propylene copolymer
are mixed and supplied to the feeding finnel of laboratory chill roll extrusion equipment of the Erwerp Company, comprising a plasticizing extruder, a flat film die, a suction knife, an air knife, a cooling roller I, a stripping roller, a cooling roller II and a take-off unit, melted in the plasticizing extruder at a temperature profile of 180°/220°/235°/235° C., forced at 230° C. through the flat film die having a die width of 650 mm and pressed by means of the air knife onto the cooling roller I and cooled, then trimmed, drawn off and ran on a central winder. The "neck-in" during the manufacture of the sheets is 70 mm, that is, the realistic width of the sheet is 580 mm. The distribution of thicknesses of the chill roll extruded sheet is of the order of 50±0.4 um.

The resulting thermal shock-resistant 50 μm covering sheet has tensile strength of 40 MPa, an elongation at break of 600% and a tensile modulus of elasticity of 580 MPa. The covering sheet is welded with a modified polypropylene thermoformed sheet into a meal package and subjected to hot steam sterilization for 10 minutes at 135° C. The hot steam sterilization does not lead to any leaks in the meal package.

A chill roll extruded sheet, 50 μm thick and produced under the same conditions from the polypropylene copolymer, having a melt index of 8.5 g/10 min at 230° C./2.16 kg, a density of 0.905 g/cc at 23° C. and an ethylene content of 4.0 mole percent, has a "neck-in" during the manufacture of the sheet of 120 mm, that is, the realistic sheet width is only 530 mm. The thickness distribution of the film is of the order of 50±1.8μm. Meal packages, produced under the same conditions, cannot be sterilized with hot steam at 135° C.

EXAMPLE 3

Preparation of the Modified Polypropylene Polymer

Into a stainless steel reactor, which can be heated, has a capacity of 12 L and is installed in gamma radiation equipment of the "Gammabeam" type, 2250 g of a not stabilized polypropylene powder, with particle diameters of 50 to 750 μm, a melt index of 0.5 g/10 min at 230° C./2.16 kg, are transferred. After the heating is switched on, the stainless steel reactor is flushed several times with argon and subsequently supplied with 18 g of vinyltriethoxysilane. After the stainless steel reactor is heated to 130° C. and the radiation sources are positioned in the irradiation position, an irradiation is conducted at a dose rate of 55 krd/hour. After irradiating for 40 minutes, the total gamma radiation dose absorbed is 36.6 krd. After the radiation sources are lowered into the source container, the stainless steel reactor is cooled to room temperature and the polypropylene, grafted with vinyltriethoxysilane, is dried under a vacuum for 1 hour at 140° C.

The resulting modified polypropylene contains 0.9% of bound vinyltriethoxysilane, as determined by IR spectroscopy, and has a melt index of 1.95 g/10 min at 230° C./2.16 kg.

Preparation of the Polypropylene Mixture

A mixture of
50% by weight of a modified polypropylene, which contains 0.9% of bound vinyltriethoxysilane, as determined by IR spectroscopy, has a melt index of 1.95 g/10 min at 230° C./2.16 kg and was charged with 0.04% by weight of dibutyl tin dilaurate, based on the modified polypropylene, and
50% by weight of a polypropylene block copolymer, with the type name of Daplen CFC 2012, having a melt index of 1.2 g/10 min at 230° C./2.16 kg, a density of 0.91 g/cc and an ethylene content of 8.3% by weight
is melted in a Werner & Pfleiderer ZSK 84 twin screw extruder with a temperature profile of 100°/145°/185°/210°/220°/200°/185° C., homogenized, discharged and granulated.

The resulting polypropylene compound has a melt index of 1.4 g/10 min at 230° C./2.16 kg and a density of 0.91 g/cc at 23° C.

Preparation of the 1 mm Sheet

In a Reifenhäuser glazing roller installation for manufacturing sheets, comprising a plasticizing extruder, a flat film die, a 3-roller glazing roller system and take-off equipment, the polyolefin compound is melted in the plasticizing extruder at a temperature profile of 180°/220°/235°/235°/240° C. and the film is extruded at 230° C. through the flat film die with a die width of 800 mm, smoothed by the glazing rollers and taken off as a 1 mm sheet.

From the "neck-in" of the sheet of 80 mm, a real sheet width of 720 mm results. The elevation of 1.5 mm, set during the manufacture in the glazing gap, is very constant and never tears off. As a result, the sheet has a constant, uniform glossy surface. The thickness distribution is 1 mm±10 μm.

In order to determine the thermal shock stability, the sheet is heated to 170° C. in thermoforming equipment according to the Throne method (Throne, J. "Thermoforming", p. 115–116), and the time t, until the sample sags 70 mm, is determined.

The 70 mm mark is attained after 88 seconds by the sheet made from the polyolefin compound of 50% by weight of modified polypropylene and 50% by weight of amorphous propylene copolymer.

A 1 mm sheet of 50% by weight unmodified polypropylene and 50% by weight of amorphous propylene copolymer, produced under the same conditions, has a "neck-in" of 150 mm, so that the real sheet width is only 650 mm. The set elevation tears off several times and results in different surfaces (glossy–matte). The thickness distribution of the sheet is 1 mm±21 μm. The thermal shock resistance determination by the Throne method gives a sag up to the 70 mm mark already after 58 seconds.

Example 4

Synthesis of the Modified Propylene Polymers

A powdery polypropylene homopolymer, with a melt index of 0.2 g/10 min at 230° C./2.16 kg and an average particle size of 0.55 mm, is metered continuously into a continuous mixer, which can be heated. Furthermore, 0.1% by weight of calcium stearate and 0.3% by weight of bis(t-butylperoxy)-2,5-dimethylhexane, in each case based on the polypropylene homopolymer, are metered continuously into the continuous mixer. While being mixed homogeneously at 45° C., the polypropylene homopolymer, charged with the thermally decomposing free radical-forming agent and auxiliary material, is charged absorptively during a residence time of 6 minutes at 45° C. by means of a mixture of butadiene and nitrogen with 0.5% by weight of butadiene, based on the polypropylene homopolymer. After transfer to a twin screw extruder, the powdery reaction mixture, in contact with the mixture of butadiene and nitrogen, with which it has been charged, and with addition of 0.1% by weight of tetrakis(methylene(3,5-di-t-butyl-hydroxycinnamate))methane, 0.1% by weight of tris (2,4-di-t-butylphenyl)-phosphite) and 0.1% by weight of pentaerythritol tetrakis-3-(3,5-di-t-butyl-4-hydroxyphenyl) propionate is melted at a mass temperature of 235° C. and, after a coarse degassing, subjected to a fine degassing with addition of water as an entraining agent, discharged and granulated.

The resulting, modified polypropylene contains 0.16% by weight of bound butadiene as determined by IR spectroscopy and has a melt index of 2.7 g/10 min at 230° C./2.16 kg and a crystallization point (DSC) of 127.2° C.

Preparation of the Polypropylene Mixture and the Foamed Polyolefin Sheet

A mixture of
90% by weight of a modified polypropylene, containing 0.15% by weight of bound butadiene, as determined by IR spectroscopy, and having a melt index of 2.7 g/10 min at 230° C./2.16 kg,
10% by weight of a propylene block copolymer, with the type name of Daplen DSC 1012 and having an ethylene content of 8.3% by weight and a melt index of 3 g/10 min at 230° C./2.16 kg and
0.15% by weight, based on the sum of the polyolefins, of a mixture of blowing agents based on bicarbonate and citric acid,
is supplied by means of a metering system as a dry blend to the feeding funnel of a single screw extruder with a screw diameter of 90 mm, an L/D of 35 and a temperature profile of 200°/230°/230°/190°/160°/160°/160°/160°/160°/160° C. Initially, the mixture is melted and homogenized before, after about 16 D, butane (1.5 kg/h) is injected into the melt through a special metering unit and subsequently mixed intensively in the extruder and distributed homogeneously. After that, the melt is cooled to the foam temperature, transferred by a melt onto a ring-shaped die and taken off over a calibrating mandrel with internal air cooling as a foamed film bubble, slit, collapsed and wound up.

The resulting foam sheet, with a thickness of 1.2 mm and a density of 265 kg/m³, has a fine celled, closed-cell foam structure. The tensile modulus of elasticity of this film is 289 MPa measured in the longitudinal direction and 252 MPa measured in the transverse direction, the associated yield stress being 7.2 MPa in the longitudinal direction and 6.3 MPa in the transverse direction. After exposure to hot steam (145° C. for 5 minutes), the density increases to 25 kg/m³ and the tensile modulus of elasticity to 310 MPa in the longitudinal direction and 270 MPa in the transverse direction. Without using the modified polypropylene, that is, by using only unmodified polypropylenes, it was not possible to produce an accurately dimensioned, closed cell foamed sheet. When the gas-charged melt leaves the nozzle, it was not possible, in spite of intensive cooling, to prevent coalescence of the foam cells and to obtain a closed cell foam structure, to stabilize, and to draw off as a foamed film bubble over the cooling mandrel.

Not-crosslinked, thermoformable polyethylene foam sheets of comparable density melt during the exposure to hot steam mentioned above, because their melting point is clearly lower than that of polypropylene.

EXAMPLE 5

Preparation of the Modified Propylene Polymers

A powdery, random polypropylene copolymer, with a melt index of 0.25 g/10 min at 230° C./2.16 kg and an average particle diameter of 0.42 mm, 0.05% by weight of hydrotalcit, 0.05% by weight of calcium stearate and 0.275% by weight of t-butyl peroxybenzoate and 0.2% by weight of divinylbenzene, in each case based on the polypropylene copolymer were added to a discontinuous rapid mixer, which can be heated. The modification reaction was carried out at 140° C. for a period of 120 minutes with intensive mixing of the charged polypropylene copolymer powder. After addition of 0.2% by weight of Irganox B225, the modified polypropylene copolymer is transferred to a twin screw extruder, melted as a mass temperature of 235° C., discharged and granulated.

The resulting, modified polypropylene contains 0.19% by weight of bound divinylbenzene as determined by IR spectroscopy and has a melt index of 1.7 g/10 min at 230° C./2.16 kg.

Preparation of the Extrusion Coating

A dry blend of
85% by weight of a heterophasic, random, propylene-ethylene copolymer, with a melt index of 25.5 g/10 min at 230° C./2.16 kg, and
15% by weight of a modified polypropylene, containing 0.19% by weight of bound divinylbenzene and having a melt index of 1.7 g/10 min at 230° C./2.16 kg
is added to the feeding funnel of the plasticizing extruder (screw diameter of 120 mm, 30 D, a temperature profile of 190°/210°/220°/220°/230°/230°/230°/230°/230°/230°/230°/230°/230°/230° C.), melted, homogenized and at an ejection rate of 140 kg/h through the flat film die (b=1700 mm), coated at the rate of 300 m/min onto a polypropylene nonwoven with a mass per unit area of 17 g/m².

The "neck-in" of the coating is 60 mm, that is, the real coating width is 1640 mm, the thickness of the coating is 5 µm±0.3 µm and the coating contains 0 holes/m².

If a dry blend of 100% by weight of a heterophasic, random, propylene-ethylene copolymer with a melt index of 5.5 g/10 min at 230° C./2.16 kg as well as 0.1% by weight of tetra-kis(methylene(3,5-di-t-butylhydroxy hydrocinnamate)) methane and 0.1% by weight of tris-(2, 4-di-t-butylphenyl) phosphite, in each case based on the propylene-ethylene copolymer, is used for the production of the nonwoven coating under the same processing conditions, a coating rate of not more than 200 m/min can be achieved. The "neck-in" of the coating is 160 mm, that is, the real coating width is 1540 mm. The thickness of the coating is 5 µm±0.9 µm. Furthermore, the coating contains 0 holes/m² when coated at the rate of 150 m/min and 3–5 holes/m² when coated at the rate of 200 m/min.

What is claimed is:
1. Sheets, films or coatings of a high dimensional accuracy and a thermal shock stability and consisting primarily of polyolefins, the polyolefins consisting of modified polypropylenes or admixtures thereof with unmodified poypropylenes, the unmodified polypropylenes consisting of
   1) polypropylene polymers produced using Ziegler-Natta catalysts or metallocene catalysts and containing 4 to 18 carbon atoms and having a propylene content of

80.0 to 99.9% by weight, in the form of random copolymers, block copolymers and/or random block copolymers with melt indexes of 0.1 to 300 g/10 min at 230° C./2.16 kg and/or 2) a polyolefin mixture with an $M_w/M_n$ ratio of 2 to 6 and a melt index of 1 to 40 g/10 min at 230° C./2.16 kg, which consists of 2.1) 60 to 98% by weight of a crystalline copolymer of 85 to 99.5% by weight of propylene and 15 to 0.5% by weight of ethylene and/or an α-olefin of the general formula $CH_2$=CHR, in which R is a linear or branched alkyl group with 2 to 8 carbon atoms, and 2.2) 40 to 2% by weight of an elastic copolymer of 20 to 70% by weight of ethylene and 80 to 30% by weight of propylene and/or an α-olefin of the general formula $CH_2$=CHR, in which R is a linear or branched alkyl group with 2 to 8 carbon atoms, and/or 3) largely amorphous polypropylenes or propylene copolymers with a crystalline polypropylene or crystalline propylene copolymer content of less than 10% by weight, an enthalpy of melting of less than 40 J/g and a melt index of 0.1 to 100 g/10 min at 230° C./2.16 kg, the largely amorphous polypropylene being a homopolymer of propylene and/or a copolymer of propylene of at least 80 mole percent of propylene and not more than 20 mole percent of one or more α-olefins of the general formula $CH_2$=CHR, in which R is a linear or branched alkyl group with 2 to 8 carbon atoms, and/or 4) non-isotactic propylene homopolymers with a melting point of 145° to 165° C. and a melt viscosity of 200,000 cps at 190° C., a heat of crystallization of 4 to 10 cal/g and a 35% by weight to 55% by weight solubility in diethyl ether, the modified polypropylenes having melt indexes of 0.1 to 50 g/10 min at 230° C./2.16 kg and a ratio of the intrinsic viscosity of the modified polypropylene to the intrinsic viscosity of the unmodified polypropylene of largely the same weight average molecular weight of 0.20 to 0.95, and being produced a) by the treatment of propylene homopolymers and/or copolymers of propylene and ethylene or α-olefins with 4 to 18 carbon atoms or mixtures of said polypropylenes with multi-finctional ethylenically unsaturated monomers in the presence of ionizing radiation or of thermally decomposing free radical-forming agents or b) by the reaction of fnctionalized polypropylenes with multi-functional compounds of opposite reactivity, or c) by the hydrolytic condensation of polypropylenes containing hydrolyzable silane groups.

2. The sheets, films or coatings of claim 1 wherein the sheets or films are at least one of a) sheets or films produced by sheet or film blowing, b) sheets or films produced by calendering, c) sheets or films produced by a chill roll, d) sheets or films produced by a glazing roller, e) sheets or films foamed with chemical and/or physical blowing agents and the coatings are at least one of a) coatings produced by calendering, b) coatings produced by a chill roll, c) coatings produced by a glazing roller, d) coatings produced by extrusion coating, e) coatings produced by pipe coating, f) coatings produced by cable coating.

3. The sheets, films or coatings of claim 2, wherein the polypropylenes in the sheets or films produced by the film blowing method or in the sheets, films or coatings produced by calendering consist of 5 to 50% by weight of the modified polypropylenes having melt indexes of 0.25 to 8 g/10 min at 230° C./2.16 kg and 95 to 50% by weight of the unmodified polypropylenes having melt indexes of 0.25 to 20 g/10 min at 230° C./2.16 kg.

4. The sheets, films or coatings of claim 2, wherein the polypropylenes in the sheets, films or coatings produced by a chill roll consist of 5 to 30% by weight of modified polypropylenes having melt indexes of 1 to 30 g/10 min at 230° C./2.16 kg and 95 to 70% by weight of unmodified polypropylenes having melt indexes of 1 to 40 g/10 min at 230° C./2.16 kg.

5. The sheets, films or coatings of claim 2, wherein the polypropylenes in the sheets, films or coatings produced by a glazing roller consist of 5 to 30% by weight of modified polypropylenes having melt indexes of 0.25 to 15 g/10 min at 230° C./2.16 kg and 95 to 70% by weight of unmodified polypropylenes having melt indexes of 0.25 to 20 g/10 min at 230° C./2.16 kg.

6. The sheets, films or coatings of claim 2, wherein the polypropylenes in the sheets or films foamed with physical and/or chemical blowing agents, consist of 5 to 100% by weight of unmodified polypropylenes having melt indexes of 0.25 to 12 g/10 min at 230° C./2.16 kg and 95 to 0% by weight of unmodified polypropylenes having melt indexes of 0.25 to 12 g/10 min at 230° C./2.16 kg.

7. The coatings of claim 2, wherein the polypropylenes in the coatings, produced by extrusion coating consist of 5 to 30% by weight of the modified polypropylenes having melt indexes of 1 to 50 g/10 min at 230° C./2.16 kg and 95 to 70% by weight of the unmodified polypropylenes having melt indexes of 2 to 100 g/10 min at 230° C./2.16 kg.

8. Sheets, films or coatings according to claim 1, wherein the polyolefins consist of 5 to 50% by weight of the modified polypropylenes and 95 to 50% by weight of the unmodified polypropylenes and the unmodified polypropylenes have melt indexes of 0.1 to 100 g/10 min at 230° C./2.16 kg.

9. Sheets, films or coatings according to claim 8, wherein the modified polypropylenes have melt indexes of 1 to 40 g/10 min at 230° C./2.16 kg.

10. Sheets, films or coatings according to claim 8, wherein the functionalized polypropylenes contain acid and/or acid anyhdride groups and are reacted with $C_2$ and $C_{16}$ diamines and/or $C_2$ to $C_{16}$ diols.

11. Sheets, films or coatings according to claim 1, wherein the unmodified polypropylenes consist of propylene homopolymers and/or copolymers of propylene, ethylene and/or α-olefins produced using Ziegler-Natta catalysts or metallocene catalysts and containing 4 to 18 carbon atoms and having a propylene content of 80.0 to 99.9% by weight in the form of random copolymers, block copolymers and/or random block copolymers having melt indexes of 0.1 to 300 g/10 min at 230° C./2.16 kg.

12. Sheets, films or coatings according to claim 1, wherein the unmodified polypropylenes consist of apolyolefin mixture with an $M_w/M_n$ ratio of 2 to 6 and a melt index of 1 to 40 g/10 min at 230° C./2.16 kg, which consists of 60 to 98% by weight of a crystalline copolymer of 85 to 99.5% by weight of propylene and 15 to 0.5% by weight of ethylene and/or an α-olefin of the general formula $CH_2$=CHR, in which R is a linear or branched alkyl group with 2 to 8 carbon atoms and 40 to 2% by weight of an elastic copolymer of 20 to 70% by weight of ethylene and 80 to 30% by weight of propylene and/or an α-olefin of the general formula $CH_2$=CHR, in which R is a linear or branched alkyl group with 2 to 8 carbon atoms.

13. Sheets, films or coatings according to claim 1, wherein the unmodified polypropylenes consist of largely amorphous polypropylenes or propylene copolymers with a crystalline polypropylene or crystalline propylene copolymer content of less than 10% by weight, an enthalpy of melting of less than 40 J/g and a melt index of 0.1 to 100 g/10 min at 230° C./2.16 kg, the largely amorphous polypropylene being a homopolymer of propylene and/or a copolymer of propylene of at least 80 mole percent of propylene and not more than 20 mole percent of one or more α-olefins of the general formula $CH_2$=CHR, in which R is a linear or branched alkyl group with 2 to 8 carbon atoms.

14. Sheets, films or coatings according to claim 1, wherein the unmodified polypropylenes consist of non-isotactic propylene homopolymers with a melting point of 145° to 165° C. and a melt viscosity of 200,000 cps at 190° C., a heat of crystallization of 4 to 10 cal/g and a 35% by weight to 55% by weight solubility in diethyl ether.

* * * * *